United States Patent [19]

Schwartzman

[11] 3,721,726
[45] March 20, 1973

[54] METHOD OF MAKING AN INTEGRALLY MOLDED APPLICATOR AND VALVE THEREFOR

[76] Inventor: Gilbert Schwartzman, 20 Wilmont Circle, Scarsdale, N.Y.

[22] Filed: Feb. 16, 1971

[21] Appl. No.: 115,398

[52] U.S. Cl. .................264/249, 264/296, 264/322
[51] Int. Cl. .............................................B29c 17/00
[58] Field of Search.......264/249, DIG. 41, 248, 249, 264/296, 322

[56] References Cited

UNITED STATES PATENTS

| 3,340,561 | 9/1967 | Schwartzman | 401/260 X |
| 3,254,147 | 5/1966 | Nakada | 264/249 X |
| 2,028,112 | 1/1936 | Westin | 264/DIG. 41 |
| 3,378,330 | 4/1968 | Schwartzman | 401/260 |
| 2,714,475 | 8/1955 | Roehrich | 401/260 X |

Primary Examiner—Robert F. White
Assistant Examiner—W. E. Hoag
Attorney—Kenneth S. Goldfarb

[57] ABSTRACT

A method of forming a fluid applicator comprising a retainer ring having a projecting portion provided with an opening therein and having a tapered flange surrounding the opening. Integral with the retainer ring is a valve assembly including a valve head and helical springs. The applicator is made through the steps of a one-piece molding after which the valve head is shaped and finished simultaneously with the swaging of a tapered flange to form a valve seat. Thereafter, the projecting portion in the form of a squeezeable container is filled and has its end crimped.

3 Claims, 8 Drawing Figures

PATENTED MAR 20 1973 3,721,726
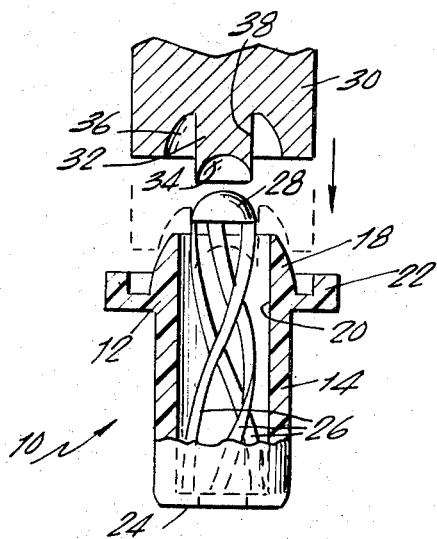
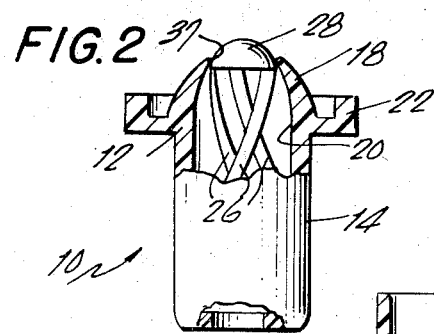
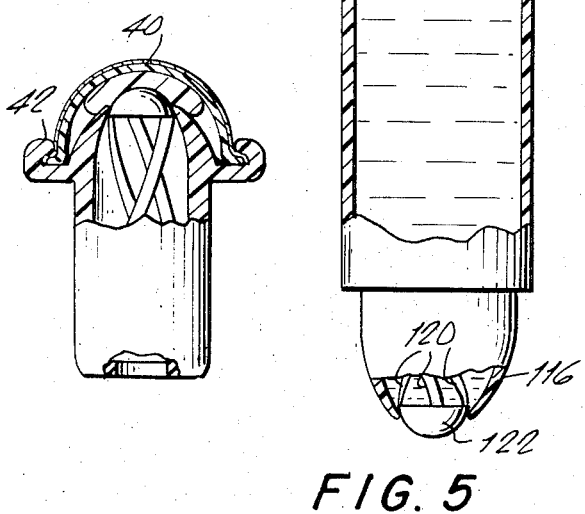
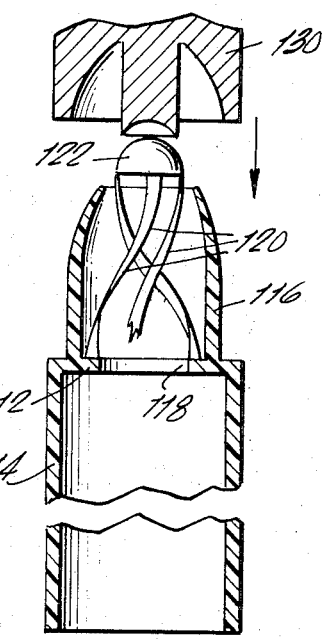
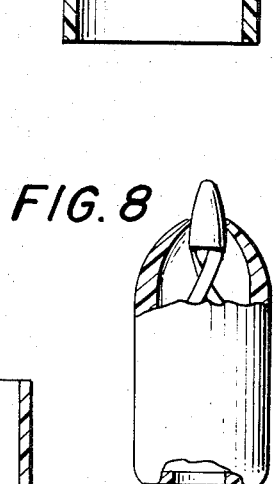
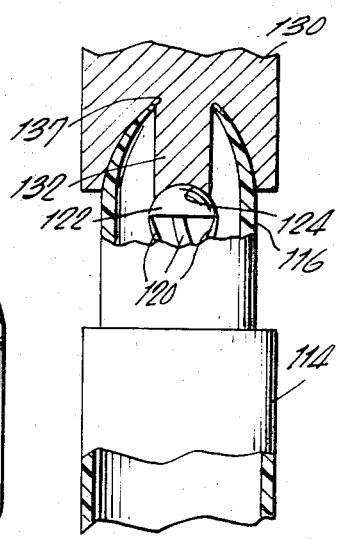
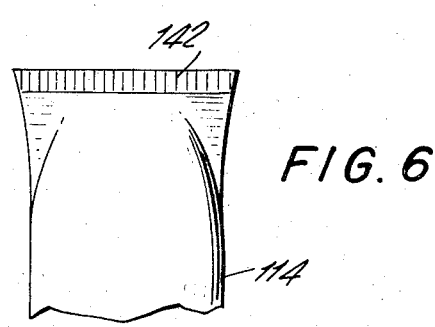
INVENTOR.
GILBERT SCHWARTZMAN
BY
ATTORNEY

METHOD OF MAKING AN INTEGRALLY MOLDED APPLICATOR AND VALVE THEREFOR

This invention relates to a fluid applicator and more particularly to an improved applicator of the type disclosed in my U.S. Pat. No. 3,203,026, issued Aug. 31, 1965, entitled "Fluid Applicator," and to a new method of manufacture thereof.

Fluid applicators have heretofore been devised which are especially adapted for applying shoe polish, cosmetics, medications, and various other pigmented and non-pigmented materials of various viscosities. These fluid applicators have employed as helical coil springs as part of a valve assembly. The valve assembly previously has necessarily been manufactured separate and distinct from a retainer ring. The present invention relates to a method whereby both the valve assembly and the retainer ring can be molded through injection molding processes in a single member. Thereafter, through various steps of the process according to the invention, the springs are placed under compressive stress and a valve seat is formed for the valve head while the valve head is depressed compressing the springs. Simultaneously the valve head may be finished and shaped. Thus, a great saving in cost of manufacture and assembly is provided while eliminating not only the high cost of manual or automatic assembly, but reducing, if not eliminating, the possibility of defective assembly.

An object of the invention resides in the provision of a fluid applicator that is simple in construction and capable of being manufactured in even very small size so as to be adapted for use in applying correction fluid, pastes, inks, and like pigments and other material which is required to be applied in a relatively fine line by relatively small containers such as those of fountain pen size.

A further object of the invention resides in the provision of a fluid applicator which includes a single one-piece construction for the entire device including the container for the substance and the valve controlled applicator.

One of the special features of the invention resides in the step of simultaneously compressing the helical coil springs while both swaging a tapered flange to form a valve seat and if desired surface finishing the valve head.

These, together with the various objects and features of the present invention, which will become apparent as the following description proceeds, are attained by this integrally molded applicator, preferred embodiments of which are illustrated in the accompanying drawing, by way of example only, wherein:

FIG. 1 is a sectional view showing the integral molded piece after the first stage in accordance with the concepts of the present invention and the manner in which the finished product is made;

FIG. 2 is an elevational view of a fluid applicator in accordance with the invention with parts being broken away to show other parts in section and in detail of the completed fluid applicator;

FIG. 3 is a view similar to FIG. 1 showing another form of the invention;

FIG. 4 is an elevational view, with parts being broken away to show other parts in detail, illustrating another step in the manufacture of the invention;

FIG. 5 illustrated in elevation, with parts being broken away to show other parts in detail;

FIG. 6 is a partial elevational view showing the crimped end of the container;

FIG. 7 is a view similar to FIG. 2 illustrating the applicator after a cover has been secured thereon; and, FIG. 8 is an elevational view of a modified form of the invention.

With continuing reference to the accompanying drawing, wherein like reference numerals designate similar parts throughout the various views, reference numeral 10 generally designates a fluid applicator constructed in accordance with the concepts of the present invention, which includes a retainer ring 12 having a projecting portion 14 and a tapered flange 16 defining a central opening 20 therethrough. The retainer ring may be provided with an outer flange 22, if desired. Integral with the projecting portion 14 is a seat 24 having the lower ends of springs 26 integral therewith, which springs are also integral with a hemispherically shaped valve head 28. The valve head can be of other configuration than the dome-shape 28 and may be a pointed, conical, or ogive shaped member, or the like, as may be desired.

In carrying out the invention, the fluid applicator in the form shown in FIG. 1 is molded in one piece by injection molding. Thereafter, it is subjected to application of a heated die 30. This die has a downwardly extending portion 32 provided with a cavity 34 therein adapted to receive and finish and/or shape the surface of the valve head 28 to a desired shape and to a desired degree of smoothness. Thus using only one mold, various shaped valve heads can be obtained. A peripheral recess 36 is formed about the projecting portion 32 for receiving the tapered flange 18 and for guiding the tapered flange inwardly while shaping it to form a valve seat 37. While shaping the valve head 28, the projecting portion 32 depresses the valve head downwardly and inwardly of the valve seat 37 and the valve seat 37 rides on the exterior surface 38 of the projecting portion 32 which is heated so as to form an exceedingly smooth edge for type registration with the valve head 28 once the die 30 is removed. Thereafter, in the manner defined in U.S. Pat. No. 3,203,026, the two-piece cover 40 may be held in place by swaging the outer flange 42. It is to be noted that in certain instances, as for example, when the fluid applicator 10 is used in a fountain pen type applicator for correction fluid or colored pigmented material, the cover 40 and flange 22 are dispensed with and the applicator is of the shape as shown in FIG. 8.

In FIG. 3 there is shown a modified form of the invention in which the retainer ring 112 is provided with a projecting portion 114 and has a tapered flange 116 rising upwardly from the retainer ring 112 in an opposite direction from the projecting portion 114. An opening 118 is provided in the retainer ring and helical coil springs 120 are integral with the retainer ring 112 and a valve head 122. A heated die 130, similar to the die 30, is used and as can be seen in FIG. 4, the valve head is depressed downwardly with the surface 124 thereof being finished and/or shaped by the projection 132 while the valve seat 137 is simultaneously finished and shaped by the die 130. Thereafter, the heated die 130 is withdrawn and the projecting portion 114 which is made of any suitable substance 140, such as a paste or liquid, after which the end of the container formed by the projecting portion 114 is crimped to form a seal as at 142.

A latitude of modification, change and substitution is intended in the foregoing disclosure, and in some instances some features of the invention will be employed without a corresponding use of other features.

I claim:

1. A method of making a fluid applicator comprising the steps of integrally molding in one piece a retaining ring having a projecting portion and having an opening therein surrounded by a peripheral flange and having a valve assembly including a valve head and helical springs integral with said valve head and said projecting portion, thereafter applying a heated die to engage said flange and said valve head and swaging said flange inwardly and finishing the surface thereof to form an inwardly turned valve seat while simultaneously shaping and finishing said valve head while compressing said springs and holding said valve head downwardly of said valve seat, thereafter, releasing said valve head and springs so that said valve head seats against said valve seat.

2. A method according to claim 1, including the further step of filling said projecting portion with a substance, and thereafter closing the end of said projecting portion opposite said flange.

3. A method according to claim 1, including subsequently filling said projecting portion with a substance, and thereafter crimping said projecting portion to close said substance in said projecting portion.

* * * * *